United States Patent [19]

Niemier

[11] Patent Number: 5,397,525
[45] Date of Patent: Mar. 14, 1995

[54] METHOD OF FORMING A KAYAK HAVING INTEGRALLY FORMED HATCH FLANGE SURROUNDING A HATCH OPENING

[76] Inventor: Timothy A. Niemier, 1731 Old Samish Rd., Bellingham, Wash. 98226

[21] Appl. No.: 108,102

[22] Filed: Aug. 16, 1993

[51] Int. Cl.⁶ .................. B29C 41/04; B29C 41/42
[52] U.S. Cl. .................. 264/154; 114/347; 264/219; 264/310; 425/425; 425/DIG. 238
[58] Field of Search ............. 114/347, 361; 264/154, 264/310, 311, 219; 425/425, 429, DIG. 238

[56] References Cited

U.S. PATENT DOCUMENTS

| | | | |
|---|---|---|---|
| 3,319,376 | 5/1967 | Doppelt et al. | 446/382 |
| 4,057,612 | 11/1977 | Clark et al. | 264/275 |
| 4,407,216 | 10/1983 | Masters | 114/347 |
| 4,520,747 | 6/1985 | Masters | 114/347 |
| 4,583,480 | 4/1986 | Hamilton et al. | 114/347 |
| 4,980,112 | 12/1990 | Masters | 264/311 |
| 5,039,297 | 10/1991 | Masters | 264/310 |
| 5,076,194 | 12/1991 | Curtis et al. | 114/347 |
| 5,094,607 | 3/1992 | Masters | 425/429 |

FOREIGN PATENT DOCUMENTS

| | | | |
|---|---|---|---|
| 2612447 | 9/1988 | France | 114/347 |
| 0424910 | 2/1926 | Germany | 114/347 |
| 2172553 | 9/1986 | United Kingdom | 114/347 |

*Primary Examiner*—Jay H. Woo
*Assistant Examiner*—Duane S. Smith
*Attorney, Agent, or Firm*—Hughes, Multer & Schacht

[57] ABSTRACT

A method of fabricating a sit-on-top kayak having a recessed cockpit surface and an integrally formed hatch flange surrounding a hatch opening. The hatch flange is substantially parallel to the cockpit surface. Such a kayak is formed with a mold having a void formed therein, the void having a recess portion for forming the flange. The recess portion of the void provides negative draft to the mold. Space is provided in the mold such that, during rotational molding, a mass of molten polyethylene accumulates adjacent to the recess containing the polyethylene that will form the flange. When the polyethylene cools and shrinks, the shrinkage of the mass of polyethylene pulls the flange at least partly out of its recess, allowing the kayak blank to be withdrawn from the mold.

18 Claims, 4 Drawing Sheets

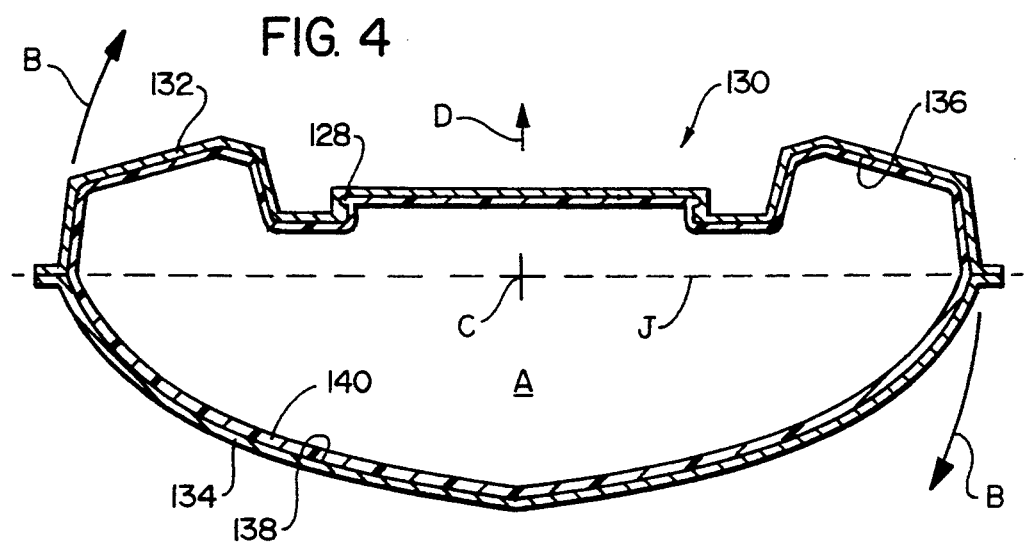
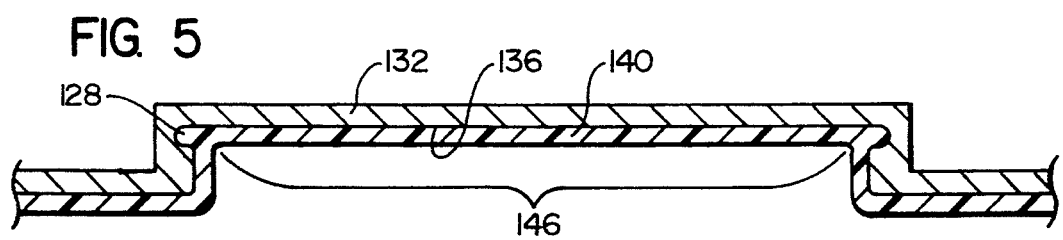
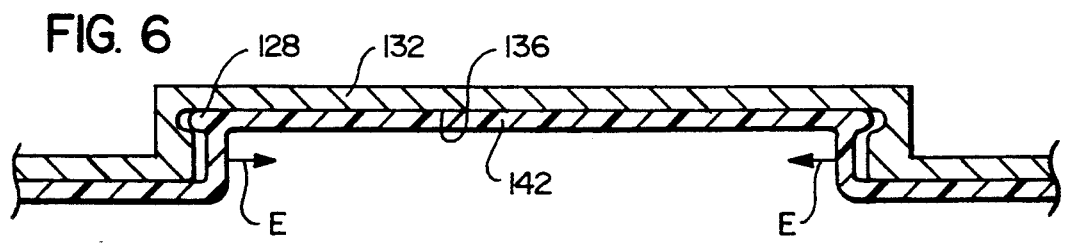
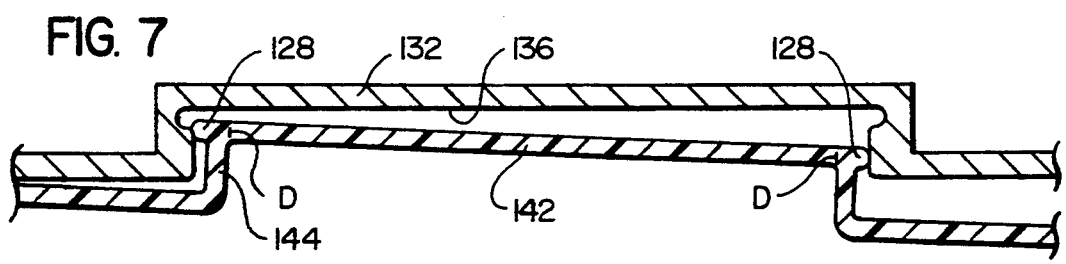

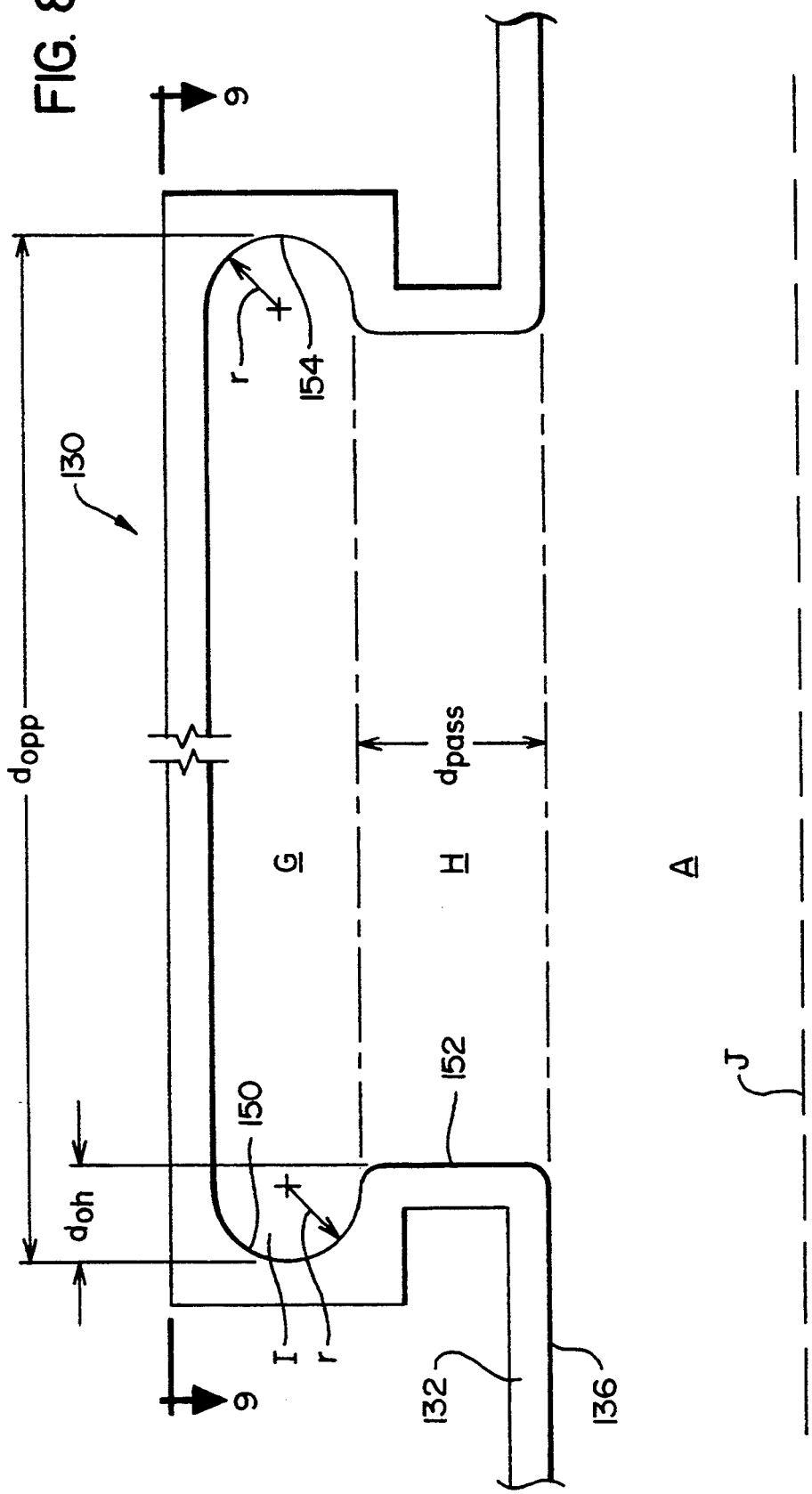

METHOD OF FORMING A KAYAK HAVING INTEGRALLY FORMED HATCH FLANGE SURROUNDING A HATCH OPENING

TECHNICAL FIELD

The present invention relates to kayaks and, more particularly, to sit-on-top kayaks having a hatch opening surrounded by a hatch flange on which a hatch cover may be mounted.

BACKGROUND OF THE INVENTION

In the last twenty years, a new type of kayak has been developed and has gained increasing acceptance. This new type of kayak is referred to herein as a sit-on-top kayak. As this name suggests, the user of a sit-on-top kayak sits in an open cockpit on top of the kayak hull. The sit-on-top kayak is somewhat similar to a surfboard in overall shape, but normally has a generally v-shaped hull portion and a deeper draft to allow better tracking. Modern sit-on-top kayaks are conventionally formed out of polyethylene using a rotational molding process.

An exemplary sit-on-top kayak is depicted at 20 in FIG. 11. This kayak 20 comprises a hollow, airtight hull 22 that will not sink when the craft is flipped over. To take advantage of the unused space within the hull 22, one or more hatch openings 24 are often formed in the kayak hull 22. Gear may be stored inside the hull 22 through the hatch opening 24. To keep the hull 22 buoyant and to keep water away from the gear stored therein, a hatch cover 26 is employed to cover the hatch opening 24.

Referring now to FIG. 2, it can be seen that, to allow hatch cover 26 to cover the hatch opening 24 in a watertight manner, a hatch flange member indicated by reference character 28 is attached around the hatch opening 24. The hatch flange member 28 comprises a plate portion 30, an intermediate portion 32, and a flange portion 34. Rivets 36 and 38 pass through the plate portion 30 of the flange member 28 and the hull 22 to fix the flange member 28 onto the hull 22. A sealant (not shown) is also applied between the plate portion 30 and the hull 22 to ensure that the connection therebetween is watertight.

The hatch flange member 28 itself is made of polyethylene and is relatively rigid. The hatch cover 26 is made of natural or synthetic rubber and is resilient and flexible. The hatch cover 26 has a first cavity 40 formed therein to receive the flange portion 34 of the flange member 28. The interaction between the flange portion 34 and the first cavity 40 helps prevent inadvertent removal of the hatch cover 26. However, when removal of the hatch cover 26 is desired, the user need merely grasp a second cavity 42 in the hatch cover 26 and twist and pull the cover 26 off of the flange member 32.

The resiliency of the hatch cover 26 and the overlap between the hatch cover 26 and the flange member 28 combine to allow an essentially watertight seal to be formed over the hatch opening 24.

Conventionally, the hatch flange 28 as described above and shown in FIG. 2 is fabricated separately from the hull 22 and attached thereto after the opening 24 has been formed. This is because: (a) in order to form the recessed cockpit 44 it is necessary that the parting line in the mold used to form the hull 22 be horizontally aligned; and (b) the flange portion 34 would require negative draft in a mold having a horizontal parting line. It is the conventional wisdom in the art of the rotationally molding kayaks to avoid such negative draft.

However, it would be desirable to fabricate a hull having an integral flange portion because this would eliminate several steps in the process of fabricating a kayak such as the kayak 20 described above.

PRIOR ART

The following U.S. Patents were brought to the Applicant's attention by a professional patentability search: (a) U.S. Pat. No. 5,076,194 issued Dec. 31, 1991 to Curtis et al.; (b) U.S. Pat. No. 4,583,480 issued Apr. 22, 1986 to Hamilton et al.; (c) U.S. Pat. No. 5,094,607 issued Mar. 10, 1992 to Masters; (d) U.S. Pat. No. 4,057,612 issued Nov. 8, 1977 to Clark et al.; and (e) U.S. Pat. No. 3,319,376 issued May 16, 1967 to Doppelt et al.

None of the foregoing patents disclose that an outwardly extending flange for a hatch cover can be formed by a rotational molding process. To the contrary, in the Masters patent, which uses a rotational molding process to form a kayak, the parting line is specifically shown orthogonal, rather than parallel, to any projections or flanges produced in the kayak by the mold. The patents to Hamilton and Curtis do not teach or suggest use of the rotational molding process to form a kayak having such a hatch cover flange. The patents to Doppelt et al. and Clark et al. do not relate to the manufacture of kayaks and are disclosed herein only as background information.

OBJECTS OF THE INVENTION

From the foregoing it should be apparent that a primary object of the present invention is to provide improved methods of fabricating hatch cover flanges on sit-on-top kayaks.

Another important, but more specific, object of the present invention is to provide hatch cover flanges for sit-on-top kayaks that provides a favorable mix of the following factors:

a. can be integrally formed in the hull of a rotationally molded polyethylene kayak;
b. allow the parting line of the mold for the kayak be parallel to the surface in which the hatch opening is formed; and
c. reliable and sturdy in operation.

Additional objects and advantages of the present invention will become apparent from the following description and accompanying drawings.

SUMMARY OF THE INVENTION

There has been invented, and disclosed herein, a new and novel method for rotationally molding out of polyethylene sit-on-top kayaks with an enclosed hull having a recessed cockpit surface and a hatch flange generally parallel to this cockpit surface integrally formed on the hull.

The formation of the cockpit surface requires the parting line of the mold used to form the kayak hull be horizontally aligned. To form a flange parallel to the cockpit surface requires negative draft in the mold used to form the kayak hull. The Applicants have discovered that the shrinkage of the polyethylene as it solidifies and cools can be used to overcome the negative draft in the mold.

In particular, the mold is designed such that, during the rotational molding process, a mass of molten polyethylene is adjacent to the flange in the direction that the flange must move to allow the hull blank to be removed from the hull. Contraction or shrinkage of this mass of polyethylene as it cools retracts the flanges at least part of the way out of their corresponding recesses. By making the flanges rounded and removing the hull blank when it is still warm, the kayak hull can be removed from its mold, the negative draft in the mold notwithstanding.

A number of factors are important for ensuring that the flange is retracted out of its corresponding recess, such as the dimensions and shape of the recess in the void, the distance between opposing points on the peripheral edge of a void of which the recess form a part, etc.

BRIEF DESCRIPTION OF THE DRAWING

FIG. 4 is a cut-away view showing the distribution of molten polyethylene within a kayak mold during the process of rotational molding;

FIGS. 5-7 depict the shrinking or contracting of polyethylene during cooling that allows the kayak hull blank to be removed from its mold;

FIG. 8 depicts certain critical dimensions of a void in the mold used to fabricate a kayak according to the principles of the present invention;

DETAILED DESCRIPTION OF THE INVENTION

Figure 1:
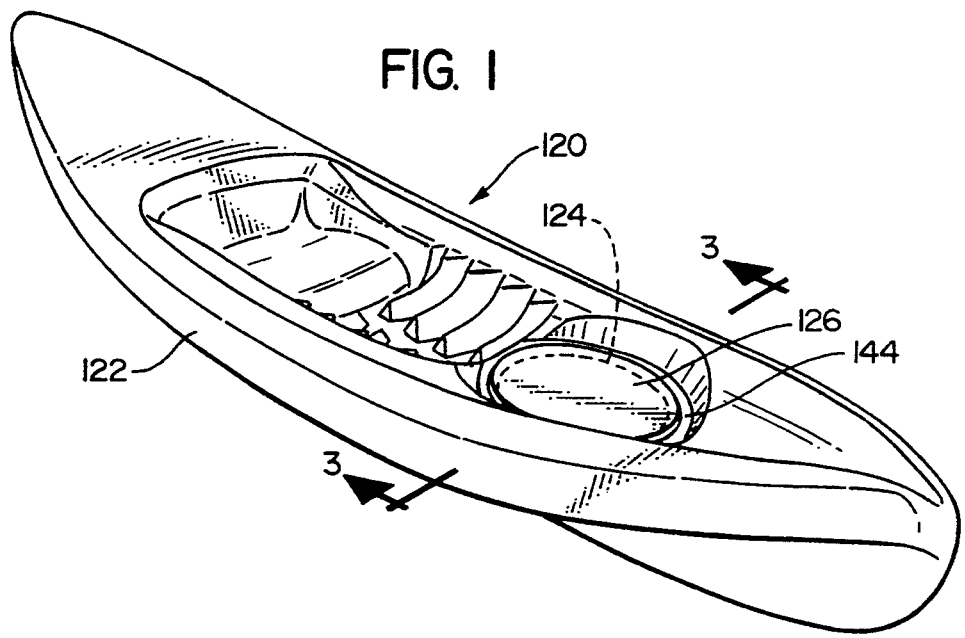
FIG. 1 is a perspective view of an exemplary sit-on-top kayak having a hatch opening therein covered by a hatch cover.
Figure 2:
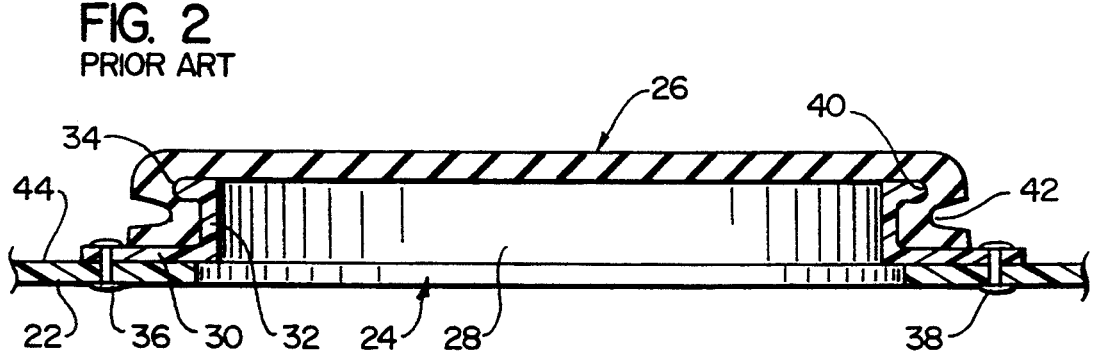
FIG. 2 is a cut-away view taken along lines 2—2 in FIG. 1 showing a prior art hatch flange for allowing the hatch cover to be attached to the kayak hull.
Figure 3:
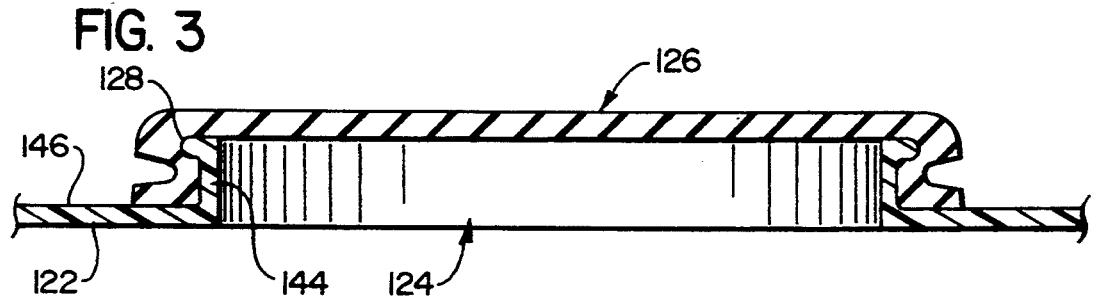
FIG. 3 is a cut-away view taken along lines 2—2 in FIG. 1 showing the integrally formed hatch flange constructed by the process of the present invention.

Referring now to the drawing, depicted in FIGS. 5, 6, and 7 is method of manufacturing a kayak 120 having a hull 122 in which is formed a hatch opening 124 covered by a hatch cover 126 as shown in FIG. 1. Importantly, the method shown in FIGS. 5, 6, and 7 yields a hull 122 having a hatch cover flange 128 integrally formed therewith as shown in FIG. 3; as shown in that Figure, the hatch cover 126 is attached to this flange 128 in a conventional manner.

The hull 120 and integral flange 128 are formed by a mold assembly 130 comprising an upper portion 132 and a lower portion 134, as shown in FIG. 4. As is well-known in the art of manufacturing kayaks, polyethylene in powder form is introduced into a cavity A defined by inner surfaces 136 and 138 of the upper and lower mold portions 132 and 134 of the mold assembly 130, heat is applied to the exterior of the mold assembly 130, and the entire mold assembly 130 is rotated as shown by arrows B and rocked along an axis identified at C in FIG. 4. The heat applied to the mold assembly 130 causes the polyethylene powder to melt. The rocking and rotating of the mold assembly 130 distributes the molten polyethylene over the inner surfaces 136 and 138 of the upper and lower mold portions 132 and 134. The resulting deposition of molten polyethylene is indicated at 140 in FIG. 4.

After the molten polyethylene is distributed over the entire mold assembly inner surfaces 136 and 138, the heating is discontinued and the polyethylene is allow to solidify. These inner surfaces 136 and 138 are contoured such that the solidified polyethylene takes on the desired shape of the kayak 120.

Referring in more detail now to FIGS. 5, 6, and 7, FIG. 5 depicts a segment of the mold upper portion 132 with molten polyethylene 140 distributed over the inner surface 136 thereof. FIG. 6 shows that the polyethylene has cooled to form a blank 142 from which the kayak hull 122 will be formed. FIGS. 5 and 6 illustrate that the polyethylene that forms the blank 142 has shrunk slightly in comparison to the molten polyethylene depicted at 140. Accordingly, as shown in FIG. 7, the blank 142 can be removed from the mold portion 132 even though the hatch flange 128 extends outwardly or overhangs in a manner that would ordinarily prevent the blank 142 from being removed from the mold portion 132. Removing the blank 142 while it is still warm and relatively flexible will facilitate its removal.

The blank 142 is next cut along a line that corresponds to a perimeter of the hatch flange 128 to form the hatch opening 124. In particular, in the exemplary kayak 120 this cut is formed along an intermediate wall 144. With this cut, the blank 142 is transformed into the kayak hull 122 shown in FIGS. 1 and 3.

As perhaps best shown in FIG. 3, the hatch flange 128 so formed extends outwardly parallel to, or overhangs, a cockpit surface 146 of the hull 22. As is well-known in the art, the cockpit surface 146 is recessed into the hull 122 approximately one foot. The intermediate wall 144 spaces the hatch cover flange 128 a short distance above the cockpit surface 146. The hatch cover 126 can be a conventional cover such as the hatch cover 26 described above and is attached and removed in exactly the same manner.

The hatch cover flange 128 may be integrally formed with the hull 122 as described above only if certain design criteria are satisfied.

First, the flange may extend outwardly or overhang only a short distance. If the flange extends too far, the shrinkage of the polyethylene as it cools will be insufficient to overcome the negative draft in the mold 130 and allow the blank to be withdrawn from the mold. The actual overhang distance depends upon the dimensions of the hatch opening around which the hatch is to be formed.

Second, the mold must be carefully designed to provide a mass of polyethylene adjacent to the flange in the direction that the flange must move in order to allow withdrawal of the blank from the mold. Referring again for a moment to FIG. 5, indicated at 146 therein is a mass of polyethylene that is adjacent to the flange 128 in the direction that the flange must move (indicated by arrows E and F in FIG. 6) to allow the blank 142 to be withdrawn from the mold. It is this mass of polyethylene 146 that shrinks during cooling to pull the flange 128 in the desired directions E and F. Without this polyethylene mass 146, the shrinkage of the flange 128 itself would be insignificant and would not necessarily move the flanges the distance required to overcome the negative draft in the mold.

Third, the overhang of the flange must be reduced as the local radius of curvature of the hatch opening becomes smaller. At corners, the radius of curvature of the hatch opening will be zero, so the flange must be eliminated adjacent to corners. The polyethylene would tend to bunch up as it shrinks and prevent the movement of the flange required to overcome the negative draft of the mold.

Fourth, the amount of overhang given to the flange is related to the distance between a first point on the flange edge and a second point on the flange opposing the first point. If the first and second points on the flange are too close to each other, the polyethylene mass between these two points will be insufficient to move the flange at these points the required distance in the necessary direction. Such a situation might occur if the flange is formed in an hourglass shaped loop, for example, where the two opposing points are located on either side of the narrow portion of the hourglass.

Fifth, the flange should have rounded edges to facilitate removal of the blank from the mold. The radius of curvature of these rounded edges should be determined based on the radius of curvature of the flange itself.

Figure 9:
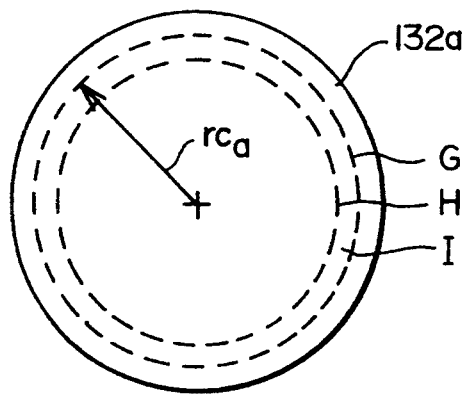
FIGS. 9 and 10 are taken along lines 9—9 in FIG. 8 to show exemplary perimeter configurations of the void depicted in FIG. 8.
Figure 10:
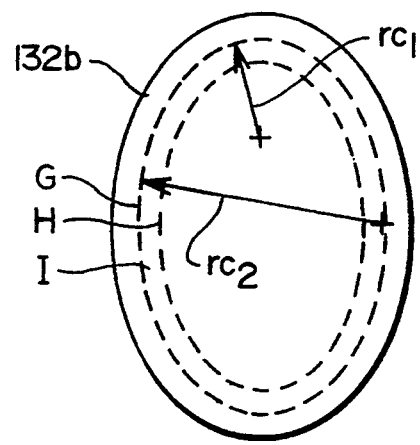
Figure 11:
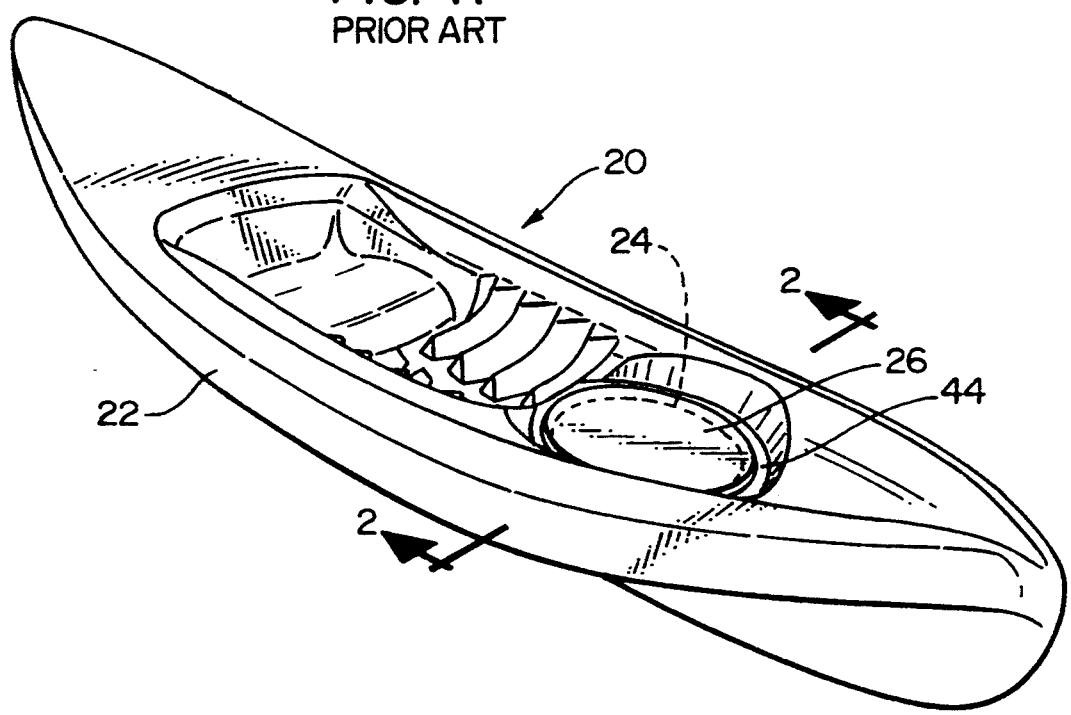
FIG. 11 is a prior art perspective view of a sit-on-top kayak having a hatch opening therin covered by a hatch cover.

The criteria introduced above will now be discussed in further detail with reference to FIGS. 8, 9, and 10.

Dot-dashed lines in FIG. 8 indicated that the interior of the mold assembly 130 may be divided into the cavity A described above, a void indicated by reference character G, and a passageway indicated by reference character H. The void G is communication with the cavity A through the passageway H. The void G is the area in the mold assembly 130 in which molten polyethylene accumulates during the rotational molding process to form the flange 128 and the polyethylene mass 146 shown in FIG. 5. The passageway H allows molten polyethylene to flow from the cavity A to the void G, and the polyethylene deposited on the mold portion inner wall 136 in the passageway H forms the short intermediate wall 148 described above with reference to FIG. 3.

To create a flange 128 that extends outwardly beyond the short intermediate wall 144 over the cockpit surface 146, a perimeter edge 150 of the void G extends outwardly beyond or overhangs a perimeter edge 152 of the passageway H an overhang distance $d_{oh}$ shown in FIG. 8. The portion of the void G that extends beyond the passageway H will be referred to herein as the overhang recess I. The overhang distance $d_{oh}$ is the length of the overhang recess I in the direction parallel to the parting line J. The outward extension of the void perimeter 150 past the passageway perimeter 152 in a direction parallel to the parting line J in FIG. 8 is commonly referred to as negative draft.

The overhang distance $d_{oh}$ described above is approximately 0.1 inches in the exemplary kayak 120. An opposing distance $d_{opp}$ between the perimeter edge at 150 and an opposing perimeter edge at 154 in FIG. 8 is approximately 8.2 inches in the kayak 120. Of importance is the ratio of the distance $d_2$ to the distance $d_{oh}$. If the ratio of $d_{opp}$:$d_{oh}$ does not exceed approximately 50:1, the mass of polyethylene between the opposing peripheral edge points 150 and 154 will be insufficient to obtain the shrinkage necessary to overcome the negative draft of the overhang recess I. In practice, this means that the amount of flange overhang must be reduced when opposing points on the flange are close together.

Another significant factor is the radius of curvature of the inner surface 136 of the mold portion 132 at the peripheral edges of the void 150 and 154. This radius of curvature, identified by r in FIG. 8, is 0.1 inches in the exemplary kayak 120. The minimum acceptable radius of curvature r of the void G is approximately 0.05 inches; that is, the flange 128 is much more likely to hang the blank 142 within the mold portion 132 if the radius of curvature falls below 0.05 inches.

Another major factor in the manufacturing method of the present invention is the radius of curvature of the hatch 128 surrounding the hatch opening 124. Referring now to FIG. 9, depicted therein is a top view of a part of a round mold upper portion 132a having a void G with a perimeter radius of curvature $rc_a$. FIG. 10 depicts part of an oval mold upper portion 132b having a void G with first and second perimeter radii $rc_1$ and $rc_2$. The perimeter radii $rc_a$, $rc_1$, and $rc_2$ should be calculated with reference to the overhang distance $d_{oh}$, or vice versa. In particular, the ratio of the overhang distance $d_{oh}$ to the radius of curvature rc of the void G should be at least 50:1; if the ratio of $d_{oh}$:rc falls below 50:1, the shrinkage of the polyethylene will be insufficient to withdraw the flange 128 from the recess I. This minimum ratio $d_{oh}$:rc would hold for any shape and prevents the fabrication of flanges extending around corners.

It may be possible to have a square or other shaped hatch opening with corners if the flange does not make the sharp turn at these corners; that is, four separate flanges would be formed along the sides of a square, and the flanges would not connect at the corners of the square. Such a square shape having discontinuous or discrete flanges could be manufactured according to the present invention and would likely function acceptably, but would provide a less watertight seal between hatch cover and hatch opening.

It follows that ojival and other shapes can be formed as long as the overhang is reduced according to the minimum ratio of $d_{oh}$:rc described above as the radius of curvature decreases. At and near discontinuities in the flange, such as where the flange navigates a corner, the flange must be eliminated; that is, the overhang distance $d_{oh}$ must go to zero.

However, the round and oval shapes are greatly preferred to other more exotic shapes.

Another factor of less importance is the length $d_{pass}$ of the passageway H. In the preferred embodiment, this length is approximately 0.5 inches but can be up to 2.0 inches as is convenient.

The mold assembly 130 constructed within the parameters described above thus allows the manufacture of a flange that overhangs in a direction parallel to the parting line J (FIGS. 4 and 8) thereof. The Applicants have thus employed the shrinkage of polyethylene as it cools and solidifies to retract the hatch cover flange from its corresponding overhang recess and obtain a kayak hull having a hatch cover flange integrally formed thereon.

From the foregoing, it should be clear that the present invention can be embodied in forms other than described above. The description set forth above is therefore to be considered in all respects illustrative and not restrictive, the scope of the invention being indicated by the appended claims rather than the foregoing description. All changes that come within the meaning and scope of the claims are intended to be embraced therein.

We claim:

1. A method of fabricating a kayak having a hull with a recessed cockpit surface and an integrally formed hatch flange surrounding a hatch opening, the hatch flange being substantially parallel to the cockpit surface, comprising the steps of:
  a. providing a mold assembly comprising a first portion and a second portion meeting along a parting line, where inner surfaces of the first and second portions of the mold assembly define an interior cavity generally corresponding to a shape of the kayak;
  b. forming a void defined by the inner surface of the first portion of the mold assembly such that
    i. the void is in communication with the interior cavity of the mold through a passageway defined by the inner surface of the first portion of the mold assembly,
    ii. the void has a recess portion that creates negative draft in the first portion of the mold assembly;
  c. placing polyethylene powder in one of the first and second portions of the mold assembly;
  d. assembling the first and second portions of the mold assembly together;
  e. heating and moving the mold to melt the polyethylene powder and distribute the molten polyethylene onto the inner surfaces defining the cavity;
  g. discontinuing heating and moving the mold to allow the molten polyethylene to solidify into a polyethylene blank in the shape of the cavity;
  f. removing the first portion of the mold assembly from the polyethylene blank; and
  g. cutting a hole in the polyethylene blank to form the hatch opening.

2. A method as recited in claim 1, in which the mold is provided such that, when the mold is heated and moved, a mass of molten polyethylene accumulates adjacent to the recess portion such that polyethylene within the recess portion is retracted from the recess portion as the mass of molten polyethylene adjacent thereto cools and solidifies.

3. A method as recited in claim 1, in which an overhang distance corresponding to a length of the recess portion formed in the mold in a direction parallel to the parting line is determined based on a distance between opposing edge points of the void.

4. A method as recited in claim 1, in which an overhang distance of the recess portion formed in the mold is determined based on a radius of curvature of a perimeter of the void.

5. A method as recited in claim 1, in which the void is formed such that a radius of curvature of an edge of the void is not less than 0.05 inches.

6. A method as recited in claim 1, in which a perimeter of the void is a shape selected from the group consisting of round and oval.

7. A method as recited in claim 1, in which an overhang distance of the recess portion formed in the mold is zero whenever a perimeter of the void turns a corner.

8. A method as recited in claim 1, in which a ratio of overhang distance corresponding to the length of the recess portion formed in the mold in a direction parallel to the parting line to a distance between opposing edge points of the void is at least 50:1.

9. A method as recited in claim 1, in which a ratio of an overhang distance of the recess portion formed in the mold to a radius of curvature of a perimeter of the void is at least 50:1.

10. A method of fabricating a kayak comprising the steps of:
  a. providing a mold assembly comprising a first portion and a second portion that meet along a parting line, where inner surfaces of the first and second portions of the mold assembly define an interior cavity generally corresponding to a shape of the kayak;
  b. forming a void in the first portion of the mold assembly, where
    i. the void is defined by a recess portion of the inner surface of the first portion of the mold assembly,
    ii. the void is in communication with the interior cavity of the mold through a passageway defined by the inner surface of the first portion of the mold assembly, and
    iii. the void has a recess portion that creates negative draft in the first portion of the mold assembly;
  c. rotationally molding melted polyethylene within the mold, where polyethylene that accumulates in the recess portion of the void in the first portion of the mold corresponds to a flange on the kayak; and
  d. allowing the polyethylene to cool and solidify such that portions of the cooling and solidifying polyethylene adjacent to the polyethylene that forms the flange shrink during cooling and retract the flange away from the recess portion of the void.

11. A method as recited in claim 10, further comprising the step of cutting a hole in the solidified polyethylene adjacent to the flange to form a hatch opening in the kayak.

12. A method as recited in claim 11, in which an overhang distance corresponding to a length of the recess portion formed in the mold in a direction parallel to the parting line is determined based on a distance between opposing edge points of the void.

13. A method as recited in claim 12, in which the overhang distance of the recess portion formed in the mold is additionally determined based on a radius of curvature of a perimeter of the void.

14. A method as recited in claim 12, in which the void is formed such that a radius of curvature of an edge of the void is not less than 0.05 inches.

15. A method as recited in claim 12, in which a perimeter of the void is a shape selected from the group consisting of round and oval.

16. A method as recited in claim 12, in which the overhang distance of the recess portion formed in the mold is zero whenever a perimeter of the void turns a corner.

17. A method as recited in claim 12, in which a ratio of the overhang distance to a distance between opposing edge points of the void is at least 50:1.

18. A method as recited in claim 12, in which a ratio of the overhang distance to a radius of curvature of a perimeter of the void is at least 50:1.

* * * * *